(No Model.)
T. WRIGHT.
STREET SWEEPING VEHICLE.
No. 371,909. Patented Oct. 18, 1887.
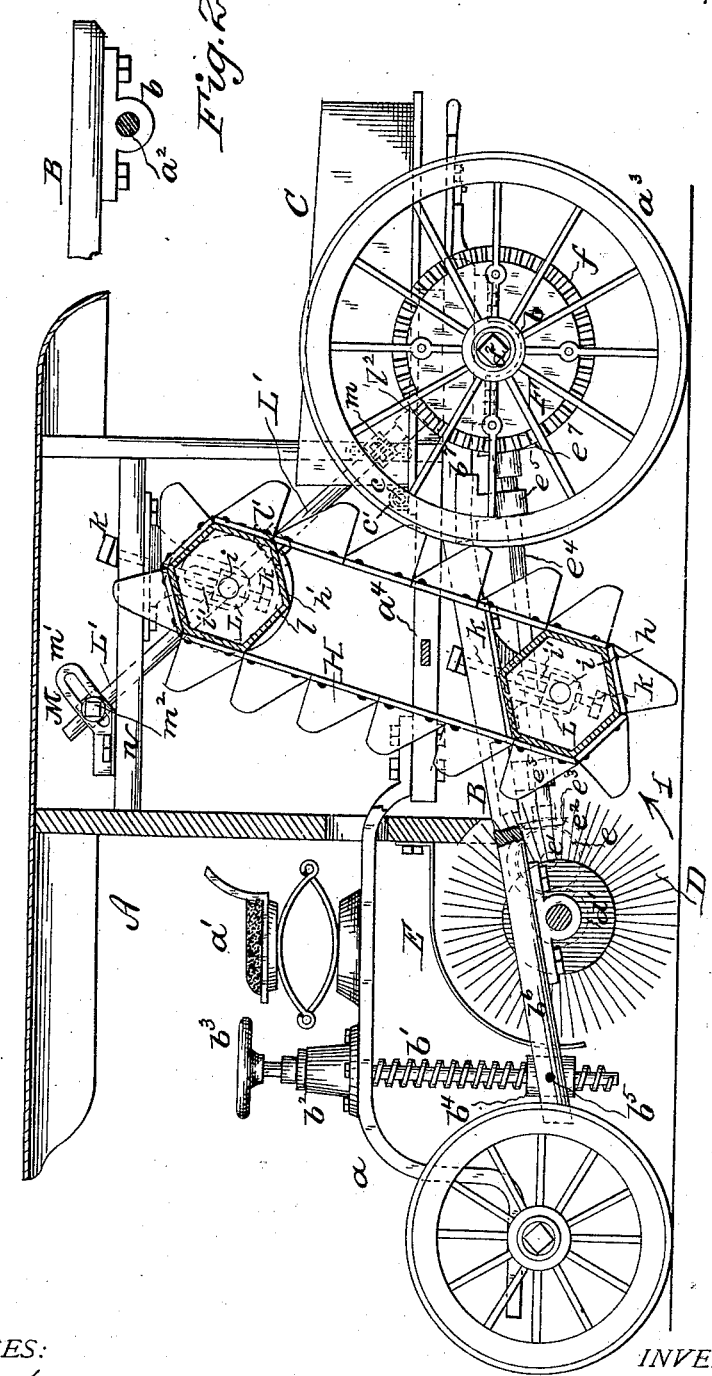
WITNESSES:
INVENTOR
Thomas Wright
By S. J. Van Stavoren
ATTORNEY (No Model.) 4 Sheets—Sheet 2.

T. WRIGHT.
STREET SWEEPING VEHICLE.

No. 371,909. Patented Oct. 18, 1887.

WITNESSES:
Wm H van Horn
Chas F Van Horn

INVENTOR
Thomas Wright
By S. J. Van Staworen
ATTORNEY (No Model.)  4 Sheets—Sheet 3.

T. WRIGHT.
STREET SWEEPING VEHICLE.

No. 371,909.  Patented Oct. 18, 1887.

WITNESSES:

INVENTOR
Thomas Wright
By S. J. Van Stavoren
ATTORNEY (No Model.)  4 Sheets—Sheet 4.

T. WRIGHT.
STREET SWEEPING VEHICLE.

No. 371,909.  Patented Oct. 18, 1887.

WITNESSES:  INVENTOR
  Thomas Wright
  By S. J. Van Stavoren
  ATTORNEY

UNITED STATES PATENT OFFICE.

THOMAS WRIGHT, OF CAMDEN, NEW JERSEY, ASSIGNOR OF ONE-HALF TO DONALD McCALLUM, OF SAME PLACE.

STREET-SWEEPING VEHICLE.

SPECIFICATION forming part of Letters Patent No. 371,909, dated October 18, 1887.

Application filed June 29, 1886. Serial No. 206,589. (No model.)

*To all whom it may concern:*

Be it known that I, THOMAS WRIGHT, a citizen of the United States, residing at Camden, in the county of Camden and State of New Jersey, have invented certain new and useful Improvements in Street-Sweeping Vehicles, of which the following is a specification, reference being had therein to the accompanying drawings, wherein—

Figure 3:
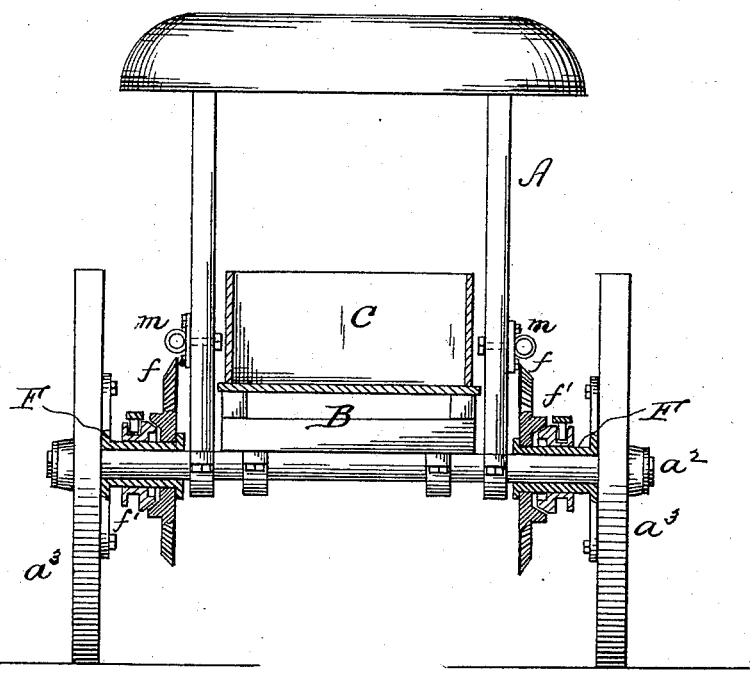
Figure 4:
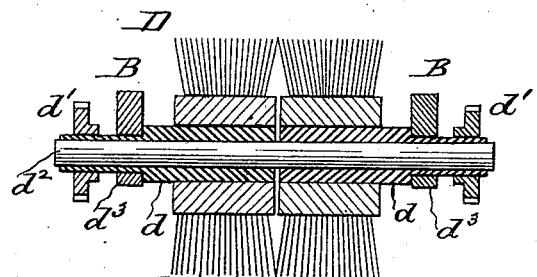
Figure 5:
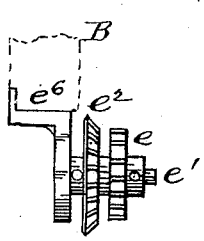
Figure 6:
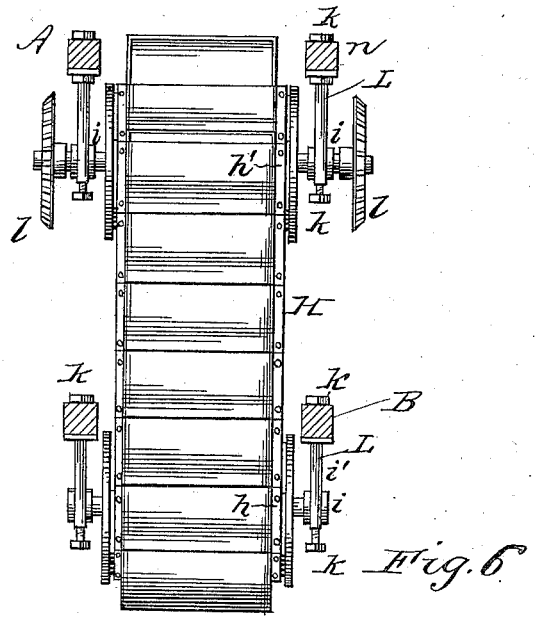
Figure 7:
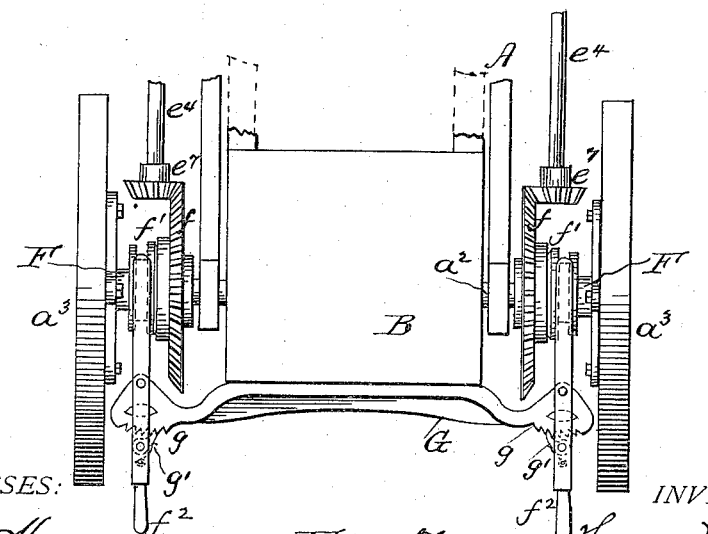
Figure 8:
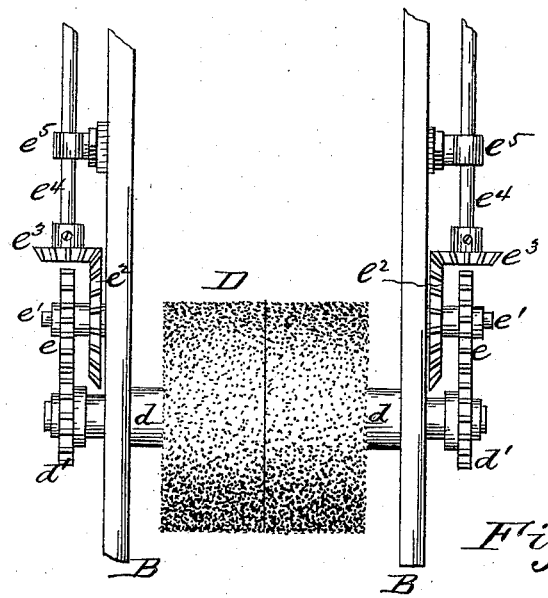
Figure 9:
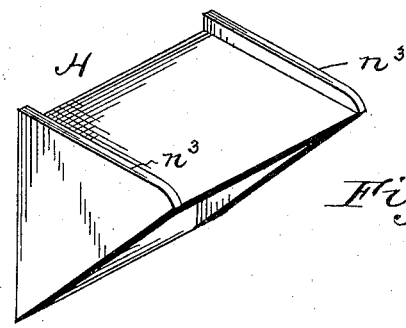

Figure 1 is a longitudinal section, partly in elevation, of a street-sweeping machine or vehicle embodying my improvements. Fig. 2 is a cross-section of rear axle, showing in elevation the hinged or pivoted connection for adjustable frame, upon which is mounted the sweeping-brush shafts and one of the shafts or rollers for the endless chain of buckets. Fig. 3 is a rear elevation, partly in section, of the sweeping-vehicle. Fig. 4 is a longitudinal section of sweeping-brush separate from the machine. Fig. 5 is an elevation of part of the gearing for transmitting power to the brush-shafts. Fig. 6 is an elevation, partly sectional, of the chain of buckets detached from the machine, showing also the adjustable bearings for the roller-shafts for the same. Fig. 7 is a plan of the rear end of the sweeping-machine. Fig. 8 is a plan of the front or brush end of the machine, and Fig. 9 is a perspective of one or a bucket detached from the endless chain of buckets.

My invention has relation to street-sweeping machines or vehicles having a rotary sweeping-brush for brushing the dirt or débris into a chain or series of endless buckets which transfer the dirt or débris to a receptacle located upon the vehicle; and it has for its object to simplify the construction and arrangement of parts, in order to make a more efficient and durable machine.

My invention accordingly consists of the novel combination, construction, and arrangement of parts, as hereinafter described and claimed.

In the drawings, A represents the vehicle, having a front platform, $a$, upon which is a seat, $a'$, for the driver. To the rear axle, $a^2$, is pivoted or hinged at $b$ a frame, B, so that it may be raised or lowered by the screw $b'$, having supporting bracket or nut $b^2$ fastened to the platform $a$, and having a hand-wheel, $b^3$, in convenient reach of the driver. The lower part of the screw $b'$ engages with a nut, $b^4$, swiveled to frame B, as shown at $b^5$, in any suitable manner to compensate for the arc or curved path traversed by the forward end of frame B as it is raised or lowered.

The frame B is of skeleton form, having preferably an inclined forward part, $b^6$, and a rear horizontal part, $b^7$, upon which rests or to which is pivoted a cart-body or other suitably-configured receptacle, C, in a position that admits of its rear end projecting back of the hind wheels, $a^3$, of the vehicle A, as shown more plainly in Fig. 1.

The cart-body or receptacle C is held in a fixed position by means of a cross-bar, $c$, (see Fig. 1,) located at its forward end, and the extremities of which enter staples or eyes $c'$, secured to the bottom timbers, $a^4$, of the vehicle, in a manner similar to the well-known form of dumping-cart, to provide for tilting or raising the receptacle C to dump the dirt therefrom either into a separate cart or vehicle or otherwise, as desired.

To the forward end of frame B is mounted the sweeping brush or brushes D, and these are preferably constructed and arranged as shown more plainly in Figs. 4 and 8, and which consist, preferably, of two separate brushes or members to form one single sectional brush, each member or section of which is secured to a sleeve, $d$, having end gearing, or, preferably, a gear-wheel, $d'$, and which are mounted upon a bar, $d^2$, in suitable bearings, $d^3$, secured to the under side of frame B, to provide for rotating the brush-sections in unison with one another as the vehicle travels in a straight line, and to rotate one independently of the other as the vehicle describes or moves in a curved line.

Surrounding the top and front side of the brushes D is a hood or cover, E, suitably fastened to the body of the vehicle, and this hood is used to confine within the vehicle the dust arising from the sweeping action of the brushes.

The gear-wheels $d'$ mesh with like wheels, $e$, mounted upon pins or stud-shafts $e'$, suitably secured to the sides of frame B, (see Fig. 8,) upon which are also mounted the bevel-wheels $e^2$. The stud-shafts preferably form part of brackets $e^6$, which are secured to the frame, as more plainly shown in Fig. 5. The gear and bevel wheels $e$ and $e^2$ on each stud-shaft $e'$ are connected so as to rotate together, and the bevel-wheels $e^2$ mesh with like wheels, $e^3$, upon shafts $e^4$, located parallel to the sides of the frame B and having suitable bearings, $e^5$, secured to said frame B. The shafts $e^4$ are located outside of the frame B and extend to the back part of the latter, and have at their rear ends bevel-wheels $e^7$, which engage with large bevel-wheels $f$, loosely mounted upon sleeves F, which are mounted upon the ends of the axle $a^2$, and are secured to the hind wheels, $a^3$, of the vehicle, so that the wheels $a^3$ and $f$ and sleeves F rotate together upon axle $a^2$, as hereinafter described, to transmit power from wheels $a^3$ to each section of brush B.

As all the parts of the gearing for the brush-sections are mounted upon frame B, and as the end wheels, $e^7$, on shafts $e^4$ mesh with the wheels $f$, which are concentric with the center or axis of the pivotal or hinged connections $b$ for frame B, said gearing does not interfere with the raising and lowering of said frame by screw $b'$ for bringing the brush D nearer to or farther away from the surface of the street or for taking up the wear of the same.

The wheels $f$ are provided with friction or other form of clutches $f'$, mounted on sleeves F, the operating-levers $f^2$ for which are pivoted to a cross-bar or other support, G, secured to the rear end of frame B, or otherwise suitably located, as desired. This support has ratchet-teeth $g$, for engagment with spring-pawls $g'$, mounted upon and moving with clutch-levers $f^2$, to provide a locking device for maintaining the clutching engagement between the loose bevel-wheels $f$ and the wheels $a^2$ during the travel of the vehicle for sweeping purposes.

By properly manipulating the clutch-levers $f^2$ both brush-sections, or either one of them, may be thrown into or out of gear with the driving-wheels $a^3$. In the one case both brush-sections will rotate and sweep in unison, and in the other one section is idle or slips upon its shaft. The latter arrangement is preferably used when the vehicle is sweeping on a curved line, while the former is employed when sweeping on a straight line.

As the brush B revolves in the direction indicated by arrow 1, Fig. 1, the dirt or débris is swept into a chain or series of endless buckets, H, and by them conveyed to the receptacle C.

The rollers $h\ h'$ for the chain of buckets H are preferably of a hexagonal form in cross-section, and the journals of roller $h$ have bearings in boxes $i$, sliding in slots $i'$ in brackets L, secured to the under side of frame B. The brackets L have adjusting-screws $k\ k$ above and below the boxes $i$. The upper roller, $h'$, has its journals provided with like bearing-boxes $i$, brackets L, and set-screws $k\ k$, the function of which is to adjust the rollers $h\ h'$ relatively to one another to give proper tension to the chain of buckets H, and so locate them that the outer edge of the buckets at the lowest part of the chain, or as they describe their circle about roller $h$, will be at the proper height from the ground or roadway, and thereby conform to the adjustment of frame B.

To provide suitable gearing between roller $h'$ and drivers $a^3$, which will not interfere with the said described adjustment of buckets H, bevel-gears $l$ are secured to each end of roller $h'$, or to its journal or shaft, (see more plainly Figs. 1 and 6,) which mesh with like wheels, $l'$, on shafts L', having at their lower ends bevel-gears $l^2$, which engage with the wheels $f$. The bearings $m\ m'$ for shafts L' have swiveled connections. The former or lower bearings, $m$, are swiveled to the sides of the vehicle, as indicated in Fig. 3, and the upper bearings, $m'$, to slotted brackets M, secured to timbers $n$ at the upper part of the vehicle-body. The bearings $m'$ have set-screws $m^2$, to fix them in their adjusted positions in the slots of brackets M. This described construction and arrangement of the brackets for shafts L' admit of movement of the same when the screws $m^2$ of bearings $m'$ are loosened to compensate for any adjustment of the endless chain of buckets H. Each bucket is preferably of a triangular shape in cross-section, although it may be otherwise suitably configured, as desired, so that when elevated or carried to the top of the vehicle in position to empty its contents the rear side of each bucket in advance of the bucket emptying forms a chute for the emptying bucket, and to prevent the dirt from falling or spreading over the sides or edges of said chutes or rear sides the latter have upwardly-projecting side flanges, $n^3$, as more plainly shown in Fig. 9.

The detail construction of parts of the foregoing-described improvements may be variously provided for, as described, within the spirit of my invention.

What I claim is—

1. A street-sweeping vehicle having a frame pivoted or hinged at one end and an adjusting-screw at the other, a sweeping-brush mounted on said frame, a chain of buckets having a roller mounted on said frame and another roller mounted on the vehicle-body, adjustable power-shaft for one of said roller-bearings, and gearing or power-transmitting devices interposed between the driving-wheels of the vehicle and said brush and between said wheels and said adjustable shaft of the rollers for the buckets, substantially as set forth.

2. A street-sweeping machine having an adjustable frame, a tilting receptacle and rotary brush supported on said frame, an endless chain of buckets having one roller-bearing in said frame and the other in the vehicle-body, adjustable power-shaft for one of said roller-bearings, and actuating devices for the brush and adjustable shaft, substantially as set forth.

3. In a street-sweeping vehicle, the combination, with adjustable frame B, brush D, and power devices, of a chain of buckets, H, having rollers, adjustable bearings for said rollers, and an adjustable power-shaft for one of the rollers, substantially as set forth.

In testimony whereof I affix my signature in presence of two witnesses.

THOMAS WRIGHT.

Witnesses:
S. J. VAN STAVOREN,
CHAS. F. VAN HORN.